(12) United States Patent
Jansen

(10) Patent No.: US 7,092,469 B1
(45) Date of Patent: Aug. 15, 2006

(54) SYNCHRONIZATION SIGNAL DETECTOR AND METHOD OF DETECTION OF SYNCHRONIZATION SIGNAL

(75) Inventor: Kaj Jansen, Salo (FI)

(73) Assignee: Nokia Corporation, Espoo (FI)

( * ) Notice: Subject to any disclaimer, the term of this patent is extended or adjusted under 35 U.S.C. 154(b) by 682 days.

(21) Appl. No.: 09/962,247

(22) Filed: Sep. 26, 2001

(51) Int. Cl.
*H04L 7/04* (2006.01)
(52) U.S. Cl. .................. 375/362; 375/340; 375/343; 375/355; 329/304; 370/208; 370/535
(58) Field of Classification Search ................ 375/226, 375/279, 280, 281, 324–326, 329, 340, 362, 375/365, 354; 370/203, 206, 208, 507, 509, 370/510, 512, 535, 537; 329/304, 345, 347–372; 714/707–709, 712
See application file for complete search history.

(56) References Cited

U.S. PATENT DOCUMENTS

| 6,377,613 B1 | 4/2002 | Kawabe et al. | |
| 6,381,251 B1 * | 4/2002 | Sano et al. | 370/480 |
| 2001/0005406 A1 * | 6/2001 | Mege et al. | 375/354 |

FOREIGN PATENT DOCUMENTS

| EP | 0 820 156 A | 1/1998 |
| EP | 1 298 813 A2 | 4/2003 |
| JP | 2000 134181 A | 5/2000 |
| WO | WO 00 67404 A | 11/2000 |

OTHER PUBLICATIONS

3rd Generation Partnership Project; Technical Specification Group Services and System Aspects IP Multmedia (IM) Subsystem-Stage 2 (Release 5), 3GPP TS 23.228 v.5.0.0(Apr. 2001), pp. 1-126.

* cited by examiner

*Primary Examiner*—Khai Tran
*Assistant Examiner*—Edith Chang
(74) *Attorney, Agent, or Firm*—Alston & Bird LLP

(57) ABSTRACT

The invention is a method and demodulator which detects periodic synchronization signals. The method of the invention includes multiplexing orthogonal signals in a wireless transmission into a signal stream; applying the signal stream to a synchronization signal detector which produces an output signal including detection of a unique code representing the synchronization signals within the signal stream; demultiplexing the output signal into orthogonal signals; calculating a function of the demultiplexed orthogonal signals and combining the function of each of the orthogonal signals into a combined output signal; averaging the combined output signal over a time period during which the synchronization signals repeat to produce an averaged signal; detecting peaks in the averaged signal; and synchronizing a demodulator in response to the peaks which demodulates the wireless transmission.

37 Claims, 3 Drawing Sheets

SYNCHRONIZATION SIGNAL DETECTOR AND METHOD OF DETECTION OF SYNCHRONIZATION SIGNAL

BACKGROUND OF THE INVENTION

1. Field of the Invention

The present invention relates to the synchronization of receivers which receive digitally encoded transmissions including orthogonal signals.

2. Description of the Prior Art

The 3GPP TS 25.211 v4.0.0 (2001-03) Technical Specification in Release 4 contains a description of group radio access network physical channels and mapping of transport channels onto the physical channels. Section 5.3.3.5 therein entitled "Synchronisation Channel (SCH)" describes the synchronization channel of the group radio access network as having two subchannels which are the primary and the secondary channels. The primary channel is described as having 15 repeating slots. Each slot contains a synchronization symbol $ac_p$ consisting of I and Q signals which are each encoded with a unique sequence of 256 chips in length. Each slot is a total of 2,560 chips in length. The remainder of the slot contains data symbols. The detection of the unique code for each of the I and Q signals by the receiver's demodulator is used to synchronize the receiver with the time base of the transmitter.

FIG. 1 illustrates a prior art demodulator used for detecting the primary channel synchronization code as described above. The demodulator 10 is only partially shown with I and Q signals from each detected synchronization symbol being provided as inputs thereto from known circuitry which is not illustrated. The I and Q signals are applied to first and second well-known identical Golay detectors 12 which are each comprised of a series of connected fixed delays D1–D8 and adders 16. As illustrated, Table 14 defines the relative delays as a function of the oversampling factor (OSF). The adders 16 are disposed between various inputs and outputs of the delays to produce products of the delayed signals.

Each of the Golay detectors 12 responds to its respective I and Q signal inputs which consist of M chips, e.g. 256 as described in the aforementioned 3GPP publication which is incorporated herein by reference in its entirety to produce a single high chip within the 256 chips of each of the orthogonal synchronization signals. The high chip from each Golay detector 12 precisely marks the time base to which the demodulator of the receiver is synchronized.

The series of connected delays D1–D8 and adders 16 produce output I and Q signals 18 and 20 which include the aforementioned chip which is high marking the time base of synchronization. The signals 18 and 20 are supposed to be high for only one chip during the synchronization slot which is detected by Golay detectors 12. However, during the remaining nine symbols of each slot, during which data is transmitted, the outputs 18 and 20 are supposed to be low and should not produce any synchronization information.

The I and Q signals 18 and 20 are applied to a signal processor 22. The processor calculates either $(I^2+Q^2)$ or the square root of $(I^2+Q^2)$. Either resultant signal is a function of the magnitude of the I and Q signals 18 and 20.

The output signal from the processor 22 is applied to an averaging unit 24 which calculates an average of all of the chips occurring during the slots, including the slots in which the synchronization signals of the synchronization symbols occur. A total of 2,560 chips are averaged by the averaging unit 24 when each of the I and Q signals of each synchronization symbol is encoded as 256 chips.

The output of the averaging unit 24 is applied to a control unit 26. The control unit 26 outputs slot timing information which is applied to the synchronization circuits 28 of the demodulator which are well known and accomplish conventional synchronization in response to slot timing information outputted by the control unit.

The prior art demodulator of FIG. 1 has disadvantages. Each of the Golay detectors 12 contains eight delay elements. The sixteen delay elements required to detect the I and Q signals of the synchronization symbol consume power proportional to the number of delay elements. Furthermore, the averaging unit is subject to producing spurious pulses which do not represent synchronization information which can increase the processing load of the control unit 26.

SUMMARY OF THE INVENTION

The present invention is a demodulator and a method of detecting synchronization signals in wireless transmissions. In a preferred embodiment, a plurality of orthogonal synchronization signals are transmitted as a synchronization symbol. In accordance with the present invention, the number of delay elements required in the synchronization signal detector to detect orthogonal synchronization signals in a wireless transmission is cut in half in comparison to the prior art as illustrated in FIG. 1. Power consumption is reduced substantially proportionally to the reduction of the number of delay elements. Furthermore, all that is required to reduce the number of delay elements in half in comparison to the prior art of FIG. 1, is that the parallel I and Q signals of the prior art are multiplexed together and processed by the single synchronization signal detector having eight delays which are twice as long as the corresponding delays of the prior art. Furthermore, the delays are implemented with an address generator which circulates the chip sequence through memory elements in circular buffer(s) which are addressed sequentially to provide the delays which are double those of the prior art.

The I and Q signals are combined together by a multiplexer and detected by the synchronization signal detector. The synchronization signal detector produces only two high level output chips during the group of chips encoding each pair of synchronization signals. Each chip of the two chips marks the time reference of synchronization for the synchronization signal from which the chip was produced.

The output of the synchronization signal detector is applied to a demultiplexer. The demultiplexer converts the multiplexed signal stream, which is inputted into the demultiplexer, back into I and Q signals which are applied to a processor. The processor computes $I^2+Q^2$ or the signal root of $I^2+Q^2$. The output of the processor is applied to an averaging unit. The averaging unit averages the output of the processor over the time base required for the synchronization signals to repeat.

The present invention further applies the output of the averaging unit to a threshold detector or maximum amplitude search function to filter from the output of the averaging unit spurious signals which should not be processed by the control unit as synchronization signals as a result of their magnitude not being large enough to be representative of signals which should be processed as potential synchronization containing signals.

The control unit further processes the peaks produced by the threshold or maximum amplitude search to remove spurious auto/cross correlation products which, because of the known timing of the occurrence of synchronization signals, may be removed as not possibly being representative of synchronization signals.

The removal of the auto/cross correlation information products increases detection range and probability.

The removal of peaks outputted by the averaging unit which do not have sufficient magnitude to be processed as synchronization signals relaxes the processing requirements of the control unit by lessening the frequency at which pulses from the averaging unit are applied to and processed by control unit thereby reducing the necessity for a high speed response by the control unit.

A method of detecting synchronization signals in accordance with the invention includes multiplexing orthogonal signals in a wireless transmission into a signal stream; applying the signal stream to a synchronization signal detector which produces an output signal including detection of a unique code representing the synchronization signals within the signal stream; demultiplexing the output signal into orthogonal signals; calculating a function of the demultiplexed orthogonal signals and combining the function of each of the orthogonal signals into a combined output signal; averaging the combined output signal over a time period during which the synchronization signals repeat to produce an averaged signal; detecting peaks in the averaged signal; and synchronizing a demodulator in response to the peaks which demodulates the wireless transmission. Threshold detecting the averaged signal may be used to produce the peaks when the averaged signal exceeds a threshold. The wireless transmission may be modulated as a direct sequence spread spectrum transmission. The peaks may be processed to remove auto/cross correlation products therein which do not represent the synchronization signals. The wireless transmission may be on a synchronization channel with the synchronization signals repeating once as a symbol within n repeating symbols with n−1 symbols therein being data and n is an integer; the orthogonal signals may be pairs of I and Q signals with each pair of I and Q signals being transmitted as a symbol; each I and Q signal may be m chips long and m is an integer; and the averaged signal may be an average of a number of chips equal to a product of n*m chips. The synchronization signal detector may comprise connected delays which are implemented in a circular buffer.

A demodulator which detects synchronization signals in accordance with the invention includes a multiplexer which is responsive to orthogonal signals to multiplex the orthogonal signals into a signal stream; a synchronization signal detector, coupled to the signal stream, which produces an output signal including detection of a unique code representing the synchronization signals within the signal stream; a demultiplexer, which is responsive to the output signal from the synchronization signal detector, which demultiplexes the output signal into an output signal containing orthogonal signals; a signal processor, responsive to the orthogonal signals outputted by the demultiplexer, which calculates a function of each of the orthogonal signals and combines the function of each of the orthogonal signals into a combined output signal; an averaging unit which averages the combined output signal over a time period during which a synchronization signals repeat to produce an averaged signal; a detector, responsive to the averaged signal, which detects peaks in the averaged signal; and a processor, responsive to the peaks, which produces a signal used for synchronizing the demodulator. The detector may be responsive to the averaged signal and comprise a threshold detector. The peaks may be processed to remove auto/cross correlation products therein which do not represent the synchronization signals. The wireless transmission may be on a synchronization channel with the synchronization signals repeating once as a symbol within n repeating symbols with n−1 symbols therein being data and n is an integer. The orthogonal signals may be pairs of I and Q signals with each pair of I and Q signals being transmitted as a symbol; each I and Q signal may be m chips long and m is an integer; and the averaged signal is an average of a number of chips equal to a product of n*m chips. The synchronization signal detector may detect the unique code and comprise connected delays which are implemented in a circular buffer.

BRIEF DESCRIPTION OF THE DRAWINGS

Like reference numerals identify like parts throughout the drawings.

DETAILED DESCRIPTION OF THE INVENTION

Figure 2:
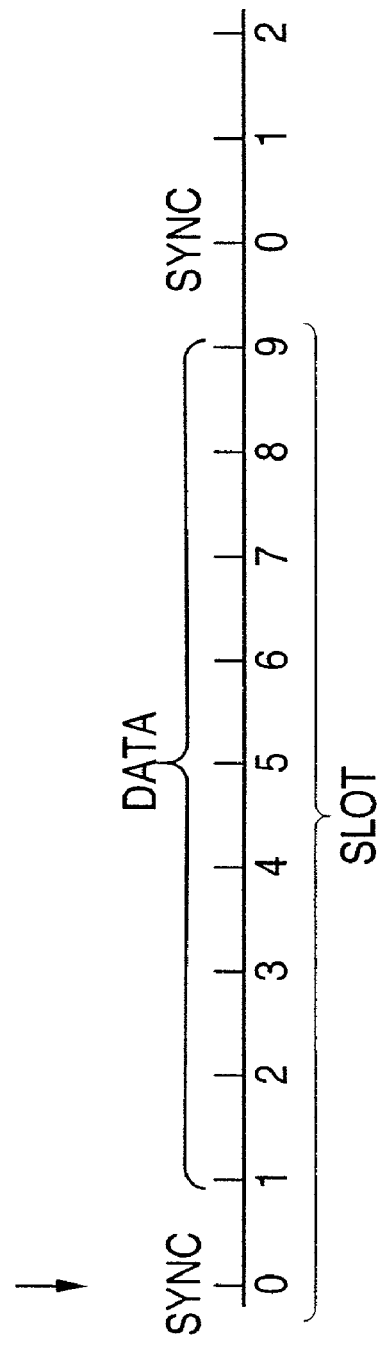
FIG. 2 illustrates synchronization signals within periodic slots utilized with the demodulator of FIG. 1.
Figure 3:
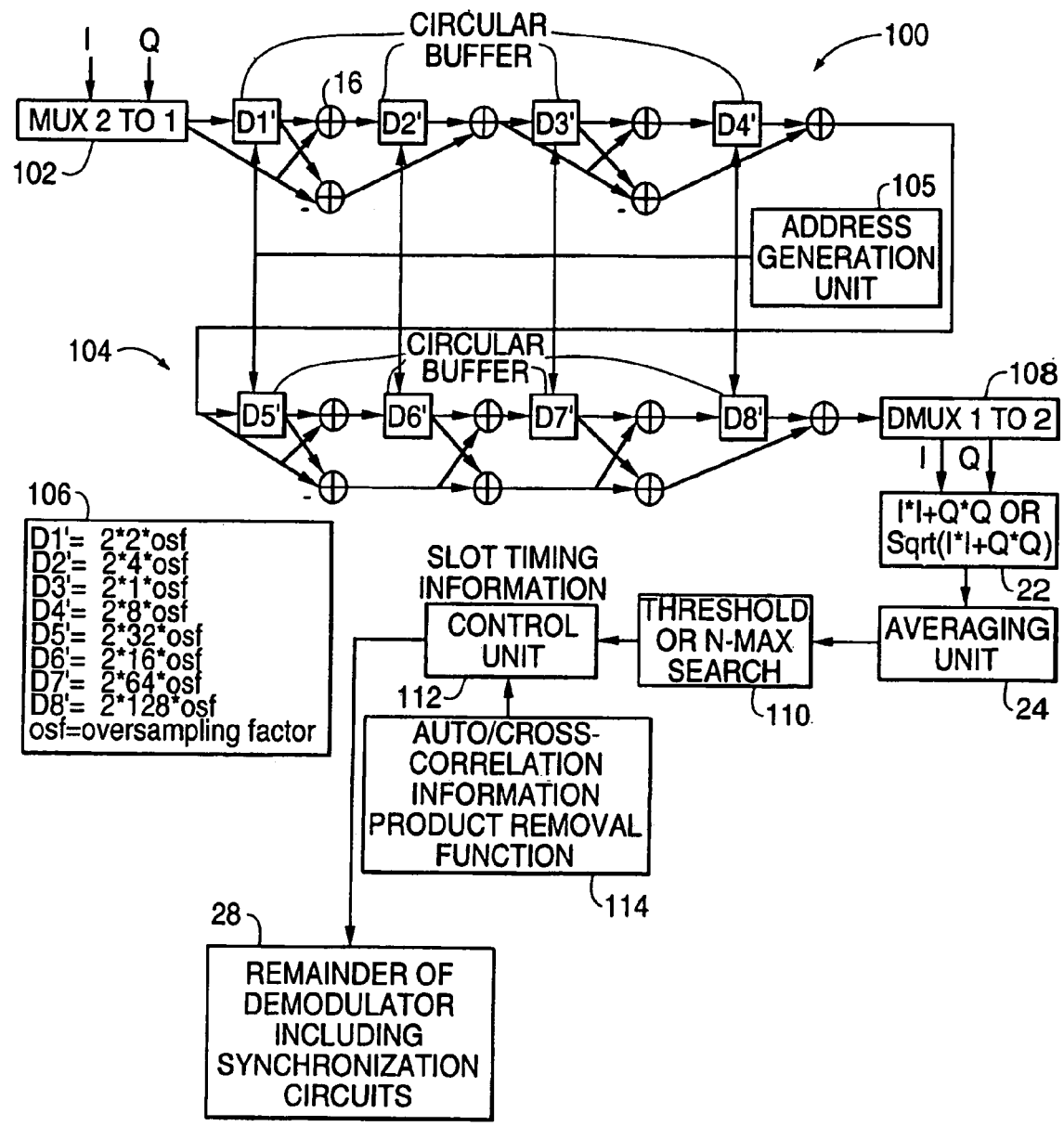
FIG. 3 illustrates a block diagram of the present invention.

FIG. 3 illustrates an embodiment 100 of the present invention. It should be understood that the embodiment is only representative of the invention with the invention not being limited thereto. The embodiment 100 differs from the prior art of FIG. 1 in several ways. First, the I and Q orthogonal signals are multiplexed together by a multiplexer 102 to produce a signal stream. Each of the I and Q signals are transmitted as pairs in a symbol. The I and Q signals from each symbol are outputted by the multiplexer 102 alternating in time. Synchronization signal detector 104 is analogous to a single synchronization detector 12 of the prior art except that the delays of the individual delay elements D1′–D8′ are twice as long. The delays may be circular buffer(s) which can be RAM(s), flip flops or other known storage devices. Table 106 sets forth the delays which, from a comparison of Table 14, reveals that each of the delays is doubled. Address generation unit 105 is used to generate addresses which circulate the chips between addressable storage units in circular buffer(s) which are coupled together so as to implement the required delays D1′–D8′. The construction of the optional circular buffer(s) is not illustrated. The synchronization signal detector 104 produces a high output during one chip of the slot for each of the I and Q signals when the multiplexed I and Q sync signals of the synchronization symbol are present. While the invention is not limited to the sequence of sync and data as illustrated in FIG. 2, the sync symbol, as illustrated, occurs as the first symbol in a slot having subsequent data symbols. Each pair of I and Q sync signals of a sync symbol are modulated as a chip sequence which is a unique code representing the synchronization signals within the signal stream. In a preferred embodiment of the present invention, the I and Q sync signals within the sync symbol are 256 chips long. The remaining symbols each have an I and Q signal encoded as 256 chips with the average being a total of 2,560 chips as described in the aforementioned 3GPP publication. The demultiplexer 108 outputs I and Q signals, which are the same as the I and Q signals which are inputted to the processor 22 of the prior art, with the detection being accomplished with one-half the delay elements D1′–D8′. The processor 22 is the same as the prior art. The output of the processor 22 is applied to the averaging unit 24 with the processing being the same as the prior art.

A threshold or N-max search function 110 detects peaks in the averaged signal which is averaged over 2,560 chips in a preferred embodiment of the present invention for each slot in which one sync symbol occurs but the invention is not limited thereto. The threshold or N-max search 110 only passes chip signals within the output of the averaging unit 24 which are large enough in magnitude to potentially be synchronization signals. The output of the threshold or N-max search 110 contains a smaller number of pulses than that produced by the averaging unit 24 of the prior art. The reduction in the number of pulses relaxes the processing requirements of the control unit 112. The control unit 112 performs processing similar to the prior art processing unit 26. However, in addition, it removes an auto/cross correlation information product in response to the inputted auto/cross correlation information product removal function 114 to remove signal peak components passed by the threshold or N-max search unit 110 which are known from the timing relationship of the sync chips relative to the remainder of the chips in the slot to be properly rejected as chips which should not be processed for purposes of synchronization. The auto/cross correlation information product removal is based upon the known timing of peaks which should be processed as a potential synchronization chip versus those which should be rejected. The output of the control unit 112 is applied to the remainder of the demodulator including synchronization circuits 28 and represents the same function as that of the prior art.

Figure 1:
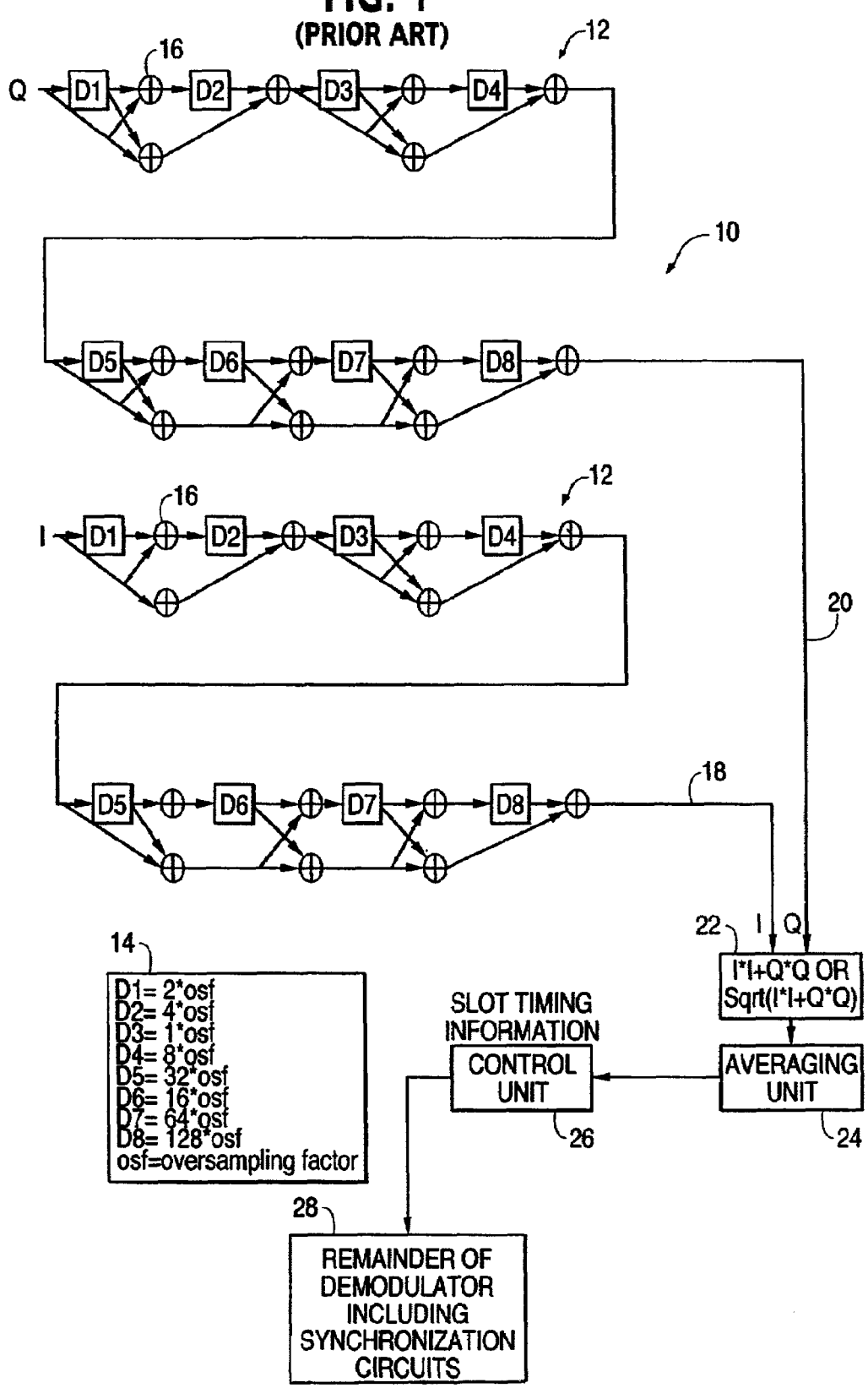
FIG. 1 illustrates a prior art demodulator which detects periodic synchronization signals in wireless transmissions.

The present invention improves the detection of synchronization signals in comparison to the prior art of FIG. 1. The number of delay elements D1'–D8' required to perform synchronization detection is reduced; the threshold or N-max searching function 110 reduces the number of peaks which are processed by the control unit 112 in comparison to the prior art to thereby relax processing requirements; and the auto/cross-correlation information product removal function 114 eliminates peaks which exceed the threshold of the function 110 from being considered as potential synchronization chips as a result of their time correlation being improper to where synchronization chips would be present.

While the invention has been described in terms of its preferred embodiments, it should be understood that numerous modifications may be made thereto without departing from the spirit and scope of the present invention. It is intended that all such modifications fall within the scope of the appended claims.

The invention claimed is:

1. A method of detecting synchronization signals comprising:
   multiplexing orthogonal signals in a wireless transmission into a signal stream;
   applying the signal stream to a synchronization signal detector of a demodulator which produces an output signal including detection of a unique code representing the synchronization signals within the signal stream;
   demultiplexing the output signal into orthogonal signals;
   calculating a function of each of the demultiplexed orthogonal signals and combining the function of each of the demultiplexed orthogonal signals into a combined output signal;
   averaging the combined output signal over a time period during which the synchronization signals repeat to produce an averaged signal;
   detecting peaks in the averaged signal; and
   synchronizing the demodulator in response to the peaks which demodulates the wireless transmission.

2. A method in accordance with claim 1 wherein the detecting of the peaks in the averaged signal comprises:
   threshold detecting the averaged signal to produce the peaks when the averaged signal exceeds a threshold.

3. A method in accordance with claim 2 wherein:
   the wireless transmission is modulated as a direct sequence spread spectrum transmission.

4. A method in accordance with claim 3 further comprising:
   processing the peaks to remove auto/cross correlation products therein which do not represent the synchronization signals.

5. A method in accordance with claim 4 wherein:
   the wireless transmission is on a synchronization channel with the synchronization signals repeating once as a symbol within n repeating symbols with n−1 symbols therein being data and n is an integer;
   the multiplexed orthogonal signals are pairs of I and Q signals with each pair of I and Q signals being transmitted as a symbol;
   each I and Q signal being m chips long and m is an integer; and
   the averaged signal is an average of a number of chips equal to a product of n and m chips.

6. A method in accordance with claim 3 wherein:
   the wireless transmission is on a synchronization channel with the synchronization signals repeating once as a symbol within n repeating symbols with n−1 symbols therein being data and n is an integer;
   the multiplexed orthogonal signals are pairs of I and Q signals with each pair of I and Q signals being transmitted as a symbol;
   each I and Q signal being m chips long and m is an integer; and
   the averaged signal is an average of a number of chips equal to a product of n and m chips.

7. A method in accordance with claim 2 further comprising:
   processing the peaks to remove auto/cross correlation products therein which do not represent the synchronization signals.

8. A method in accordance with claim 7 wherein:
   the wireless transmission is on a synchronization channel with the synchronization signals repeating once as a symbol within n repeating symbols with n−1 symbols therein being data and n is an integer;
   the multiplexed orthogonal signals are pairs of I and Q signals with each pair of I and Q signals being transmitted as a symbol;
   each I and Q signal being m chips long and m is an integer; and
   the averaged signal is an average of a number of chips equal to a product of n and m chips.

9. A method in accordance with claim 2 wherein:
   the wireless transmission is on a synchronization channel with the synchronization signals repeating once as a symbol within n repeating symbols with n−1 symbols therein being data and n is an integer;
   the multiplexed orthogonal signals are pairs of I and Q signals with each pair of I and Q signals being transmitted as a symbol;
   each I and Q signal being m chips long and m is an integer; and
   the averaged signal is an average of a number of chips equal to a product of n and m chips.

10. A method in accordance with claim 2 wherein:
the synchronization signal detector comprises delays which are implemented in a circular buffer.

11. A method in accordance with claim 1 wherein:
the wireless transmission is modulated as a direct sequence spread spectrum transmission.

12. A method in accordance with claim 11 further comprising:
processing the peaks to remove auto/cross correlation products therein which do not represent the synchronization signals.

13. A method in accordance with claim 12 wherein:
the wireless transmission is on a synchronization channel with the synchronization signals repeating once as a symbol within n repeating symbols with n−1 symbols therein being data and n is an integer;
the multiplexed orthogonal signals are pairs of I and Q signals with each pair of I and Q signals being transmitted as a symbol;
each I and Q signal being m chips long and m is an integer; and
the averaged signal is an average of a number of chips equal to a product of n and m chips.

14. A method in accordance with claim 11 wherein:
the wireless transmission is on a synchronization channel with the synchronization signals repeating once as a symbol within n repeating symbols with n−1 symbols therein being data and n is an integer;
the multiplexed orthogonal signals are pairs of I and Q signals with each pair of I and Q signals being transmitted as a symbol;
each I and Q signal being m chips long and m is an integer; and the averaged signal is an average of a number of chips equal to a product of n and m chips.

15. A method in accordance with claim 11 wherein:
the synchronization signal detector comprises delays which are implemented in a circular buffer.

16. A method in accordance with claim 1 further comprising:
processing the peaks to remove auto/cross correlation products therein which do not represent the synchronization signals.

17. A method in accordance with claim 16 wherein:
the wireless transmission is on a synchronization channel with the synchronization signals repeating once as a symbol within n repeating symbols with n−1 symbols therein being data and n is an integer;
the multiplexed orthogonal signals are pairs of I and Q signals with each pair of I and Q signals being transmitted as a symbol;
each I and Q signal being m chips long and m is an integer; and the averaged signal is an average of a number of chips equal to a product of n and m chips.

18. A method in accordance with claim 16 wherein:
the synchronization signal detector comprises delays which are implemented in a circular buffer.

19. A method in accordance with claim 1 wherein:
the wireless transmission is on a synchronization channel with the synchronization signals repeating once as a symbol within n repeating symbols with n−1 symbols therein being data and n is an integer;
the multiplexed orthogonal signals are pairs of I and Q signals with each pair of I and Q signals being transmitted as a symbol;
each I and Q signal being m chips long and m is an integer; and the averaged signal is an average of a number of chips equal to a product of n and m chips.

20. A method in accordance with claim 19 wherein:
the synchronization signal detector comprises delays which are implemented in a circular buffer.

21. A method in accordance with claim 1 wherein:
the synchronization signal detector comprises connected delays which are implemented in a circular buffer.

22. A demodulator which detects synchronization signals comprising:
a multiplexer which is responsive to orthogonal signals to multiplex the orthogonal signals into a signal stream;
a synchronization signal detector, responsive to the signal stream from the multiplexer, which produces an output signal including detection of a unique code representing the synchronization signals within the signal stream;
a demultiplexer, which is responsive to the output signal from the synchronization signal detector, which demultiplexes the output signal into an output signal containing the orthogonal signals;
a signal processor, responsive to the orthogonal signals outputted by the demultiplexer, which calculates a function of each of the orthogonal signals and combines the function of each of the orthogonal signals into a combined output signal;
an averaging unit which averages the combined output signal over a time period during which the synchronization signals repeat to produce an averaged signal;
a detector, responsive to the averaged signal, which detects peaks in the averaged signal; and
a processor, responsive to the peaks, which produces a signal used for synchronizing the demodulator.

23. A demodulator in accordance with claim 22 wherein:
the detector, responsive to the averaged signal, comprises a threshold detector.

24. A demodulator in accordance with claim 23 further comprising:
a control unit which processes the peaks to remove auto/cross correlation products therein which do not represent the synchronization signals.

25. A demodulator in accordance with claim 24 wherein:
a wireless transmission is provided on a synchronization channel with the synchronization signals repeating once as a symbol within n repeating symbols with n−1 symbols therein being data and n is an integer;
the multiplexed orthogonal signals are pairs of I and Q signals with each pair of I and Q signals being transmitted as a symbol;
each I and Q signal being m chips long and m is an integer; and the averaged signal is an average of a number of chips equal to a product of n and m chips.

26. A demodulator in accordance with claim 25 wherein:
the synchronization signal detector detects the unique code and comprises delays which are implemented in a circular buffer.

27. A demodulator in accordance with claim 24 wherein:
the synchronization signal detector detects the unique code and comprises delays which are implemented in a circular buffer.

28. A demodulator in accordance with claim 23 wherein:
a wireless transmission is provided on a synchronization channel with the synchronization signals repeating once as a symbol within n repeating symbols with n−1 symbols therein being data and n is an integer;
the multiplexed orthogonal signals are pairs of I and Q signals with each pair of I and Q signals being transmitted as a symbol;

each I and Q signal being m chips long and m is an integer; and the averaged signal is an average of a number of chips equal to a product of n and m chips.

29. A demodulator in accordance with claim 28 wherein:
the synchronization signal detector detects the unique code and comprises delays which are implemented in a circular buffer.

30. A demodulator in accordance with claim 23 wherein:
the synchronization signal detector detects the unique code and comprises delays which are implemented in a random access memory.

31. A demodulator in accordance with claim 22 further comprising:
a control unit which processes the peaks to remove auto/cross correlation products therein which do not represent the synchronization signals.

32. A demodulator in accordance with claim 31 wherein:
a wireless transmission is provided on a synchronization channel with the synchronization signals repeating once as a symbol within n repeating symbols with n−1 symbols therein being data and n is an integer;
the multiplexed orthogonal signals are pairs of I and Q signals with each pair of I and Q signals being transmitted as a symbol;
each I and Q signal being m chips long and m is an integer; and
the averaged signal is an average of a number of chips equal to a product of n and m chips.

33. A demodulator in accordance with claim 32 wherein:
the synchronization signal detector detects the unique code and comprises delays which are implemented in a circular buffer.

34. A demodulator in accordance with claim 31 wherein:
the synchronization signal detector detects the unique code and comprises delays which are implemented in a circular buffer.

35. A demodulator in accordance with claim 22 wherein:
a wireless transmission is provided on a synchronization channel with the synchronization signals repeating once as a symbol within n repeating symbols with n−1 symbols therein being data and n is an integer;
the multiplexed orthogonal signals are pairs of I and Q signals with each pair of I and Q signals being transmitted as a symbol;
each I and Q signal being m chips long and m is an integer; and
the averaged signal is an average of a number of chips equal to a product of n and m chips.

36. A demodulator in accordance with claim 35 wherein:
the synchronization signal detector detects the unique code and comprises delays which are implemented in a circular buffer.

37. A demodulator in accordance with claim 22 wherein:
the synchronization signal detector detects the unique code and comprises delays which are implemented in a random access memory.

* * * * *